United States Patent
Bangert

[11] 3,949,098
[45] Apr. 6, 1976

[54] NUTRITIOUS ORANGE DRINK CONCENTRATE, PROCESS AND DRINK RESULTANT THEREFROM

[75] Inventor: James G. Bangert, Nanuet, N.Y.

[73] Assignee: Nabisco, Inc., East Hanover, N.J.

[22] Filed: June 5, 1974

[21] Appl. No.: 476,404

[52] U.S. Cl. .............. 426/324; 426/329; 426/583; 426/590; 426/599
[51] Int. Cl.² ........................................ A23L 2/02
[58] Field of Search ............ 426/72, 185, 190, 329, 426/356, 365, 366, 73, 212, 187, 324, 330.5, 583, 590, 599, 658

[56] References Cited
UNITED STATES PATENTS

| | | | |
|---|---|---|---|
| 2,792,308 | 5/1957 | Morse | 426/329 |
| 2,919,195 | 12/1959 | Block | 426/72 |
| 3,737,326 | 6/1973 | Basso et al. | 426/187 |

Primary Examiner—A. Louis Monacell
Assistant Examiner—R. A. Yoncoskie
Attorney, Agent, or Firm—Christen & Sabol

[57] ABSTRACT

A process of preparing a nutritious orange juice concentrate by adding whey protein to a liquid admixture of water and orange juice concentrate, the liquid admixture being at a temperature between 65° and about 130°F., and then adding an imitation orange flavoring. The invention further includes another process of preparing the nutritious orange drink concentrate. The process involves adding whey protein to water or acidified water, the water being at a temperature between about 65° and about 130°F., and then adding imitation orange flavoring and orange juice concentrate. When acidified water is used, it is preferably acidified with citric acid.

6 Claims, 1 Drawing Figure

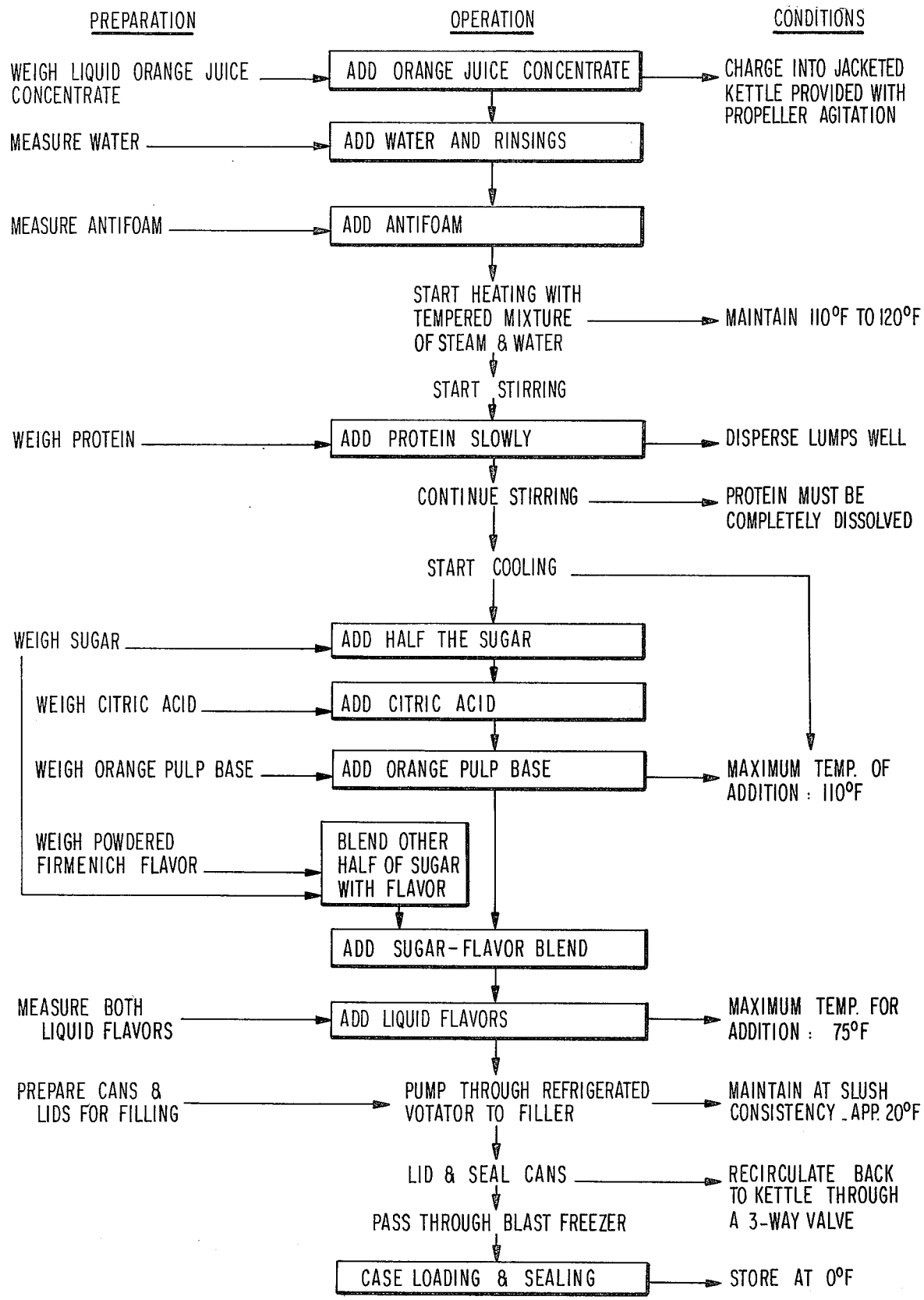

NUTRITIOUS ORANGE DRINK CONCENTRATE, PROCESS AND DRINK RESULTANT THEREFROM

BACKGROUND OF THIS INVENTION

1. Field of this Invention

This invention relates to a nutritious orange drink concentrate. This invention further relates to a protein reinforced or fortified nutritious orange drink concentrate which can be stored for long periods of time by freezing without any substantial lose of its efficacy. This invention also relates to a process of making such a nutritious orange drink concentrate. This invention still further relates to a nutritious orange drink prepared from such a nutritious orange drink concentrate.

2. Prior Art

The prior art involves various drinks available in various forms. Some are in dry form and the purchaser reconstitutes them with water. Some are in the form of a frozen concentrate and the purchaser also reconstitutes them with water. Others are ready to serve, that is, the purchaser buys them in a form ready to serve (they may have to be refrigerated for storage).

Orange juice contains acid which curdles and coagulates milk, so there have been many unsuccessful and unsatisfactory attempts to incorporate the protein and other beneficial ingredients of milk into orange juice (or vice versa). For example, the use of fermented milk causes flavor problems and coagulation problems. A number of processes have attempted to avoid the problem by using whey, but other problems have arisen. The prior art only discloses single-strength beverages in this area.

The products which have been produced under prior art teachings are far from palatable, in many cases have lost essential vitamins during the processes employed, and are sufficiently devoid of "lasting" characteristics so as to deteriorate rapidly, in the absence of consumption substantially immediately following preparation, so as to become valueless with respect to platability and also nutritional values.

It is known to make orange-flavored beverages through the use of flavoring materials such as the oil recovered from the skins of oranges, sugars, citric acid and similar ingredients. While beverages sufficiently platable to attain commercial success have been made in this way, the beverages themselves have a highly artificial flavor.

U.S. Pat. No. 3,919,195 teaches a protein-enriched acidic orange juice which involves a dispersion of a blend water-soluble egg yoke and a water-soluble naturally-occurring protein (casein, milk, protein or soy protein). The juice has a pH of 3.5 to 4.5 — the egg yolk is necessary to keep the protein (casein) from precipitating. That patent teaches that an acid, such as, citric acid, can be added and that ferric citrate can be added. The patent uses spray dried whey.

U.S. Pat. No. 2,923,628 discloses a synthetic unsaturated fatty acid milk which contains water, whey protein, fat, lactose and salts. That patent does not disclose the use of orange juice in any form. That patent teaches the addition of lactic acid to obtain a drink having a pH of 6 to 6.5 or a butter having a pH of 4 to 4.5.

U.S. Pat. No. 3,419,398 teaches a process of making a clear, dairy-product beverage. The product contains lactoglobulins of whey, inorganic salts, milk sugar, phosphorus and vitamins. That patent teaches the process of treating whey with enough citric acid to acidify the whey, treating the whey with tannic acid, separating out the precipitated gelatinous albuminous substances and recovering the liquid product. That patent does not teach the adding of orange juice concentrate.

U.S. Pat. No. 3,625,702 teaches pasteurizing and acidifying skimmed fresh milk, adding the milk to an aqueous solution of citric acid and flavoring, adding a mixture of pectin and sugar and homogenizing the mixture. That patent teaches that an orange paste can be initially admixed with the milk.

U.S. Pat. No. 3,669,678 discloses a solid composition of whey solids and comminuted sesame. The composition can be used in beverages.

U.S. Pat. No. 3,737,326 teaches a beverage mix which contains egg albumen, concentrated whey, sweetener (e.g., sugar or sucrose), color (e.g. orange), flavor (e.g., orange) and food acid (e.g., citric acid). The beverage mix has a pH of 2.5 to 4.6; the whey is used to inhibit or eliminate the taste and odor of the egg albumen; and the egg albumen to inhibit the flavor of the whey. Large amounts of egg albumen are used. The beverage mix can be reconstituted by the addition of water. That patent does not teach using orange juice concentrate. U.S. Pat. No. 3,736,150 teaches a beverage mix which is similar to that U.S. Pat. No. 3,737,326, except that an amino acid is used and whey is not used.

U.S. Pat. No. 3,764,710 discloses a fruit drink containing concentrated orange juice containing pulp material, fermented or acidified milk, sugar, flavoring agents and coloring agents. Citric acid can be used.

Several earlier U.S. patents refer to the use of whey in orange juice. U.S. Pat. No. 2,282,801 treats fruits and vegetables with whey to stabilize them against oxidation. Orange juice is not mentioned. U.S. Pat. No. 2,391,559 dissolves dried whey in an aqueous alkaline solution, neutralizes it with citric acid, adds the resulting material to orange juice and adds sugar to produce a foaming beverage. That patent, however, fails to, for example disclose specifically the use of orange pulp base or the use of an acid pH. U.S. Pat. No. 1,759,706 uses whey to precipitate oils from orange juice and thus provides a beverage free of the oils and albuminoids which is useful, for example, in the treatment of obesity.

General Foods Corporation marketed a beverage mix under the trade name Instant Replay, which had the following ingredients: sugar, citric acid, natural and artificial flavors, calcium phosphate, monosodium phosphate, sodium citrate, calcium lactate, potassium chloride, gum arabic, Vitamin C, hydrogenated vegetable oil, magnesium sulphate, artificial color, and BHA.

Natural orange juice has a sugar-acid ratio that is generally between 11.1 and 7:1.

Attention is drawn to U.S. Pat. Nos. 2,858,221, 2,890,961, 3,114,641, 3,647,475, 3,657,424, 3,041,180, 3,397,063, 3,525,624, 3,705,039, 3,728,132, 2,818,342, 2,834,679, 2,853,386, 2,859,115, 2,924,531, 3,118,769, 3,174,865, 3,647,476, 3,692,532, 2,224,252, 1,925,441, 2,055,782, 2,400,460, 1,885,401, 2,650,880, 2,367,131, 3,660,115, 3,672,917 and 3,715,216.

BROAD DESCRIPTION OF THIS INVENTION

An object of this invention is to prepare and obtain a nutritious orange drink concentrate. Another object of this invention is to prepare and obtain a protein-reinforced or fortified nutritious orange drink concentrate which can be stored for long periods of time by freezing without any substantial loss of its efficacy. A further object of this invention relates to a nutritious orange drink prepared from such a nutritious orange drink concentrate. A still further object of this invention is to obtain a frozen nutritious orange drink concentrate which can be reconstituted with water. Another object of this invention is to provide a new and improved orange drink which is highly palatable and nutritious.

These and other objects of the invention which will be set forth hereinafter or will be apparent to one skilled in the art upon reading these specifications, are accomplished in the products and by the procedures of which certain exemplary embodiments are described below.

This invention involves a nutritious orange drink concentrate which includes orange juice concentrate, water, whey protein, and imitation orange flavoring. The drink concentrate is capable of being frozen for storage. Also, the drink concentrate has a pH between about 3 and about 4.5. More specifically, the nutritious orange drink concentrate contains from about 19 to about 40 percent of orange juice concentrate (ranging from 45° to 58° Brix), from about 1 to about 27 percent of whey protein concentrate from about 0.1 to about 4 percent of initation orange flavoring, and from about 23.5 to about 53 percent of water. The whey protein concentrate provides a protein content of about 0.5 to about 10 percent protein, based on the entire composition.

This invention further involves a nutritious orange drink concentrate which contains sugar, citric acid and orange pulp base, in addition to the above ingredients. More specifically, the nutritious orange drink concentrate contains from about 0.1 to about 16.1 percent of sugar, from about 0.01 to about 3 percent of citric acid and from about 0.01 to about 0.5 percent of orange pulp base, in addition to the above ingredients and specific amount ranges. This invention even further includes the nutritious orange drink concentrate which contains an antifoaming agent. More specifically, the nutritious orange drink concentrate contains about 0.0001 to about 0.1 percent of the antifoaming agent, in addition to the above ingredients and specific amount ranges.

Preferably the antifoaming agent is Antifoam AF 72. Preferably the whey protein is ForeTein 35 whey protein. The preferred nutritious orange drink concentrate contains 37.381 percent of frozen orange juice concentrate (45° Brix), 36.482 percent of water, 18.045 percent of ForeTein 35 whey protein, 5.952 percent of sugar, 1.105 percent of citric acid, 0.425 percent of orange pulp base, 0.604 percent of imitation orange flavoring and 0.006 percent of Antifoam AF 72.

This invention also involves a process of preparing the nutritious orange drink concentrate. The process includes adding whey protein to a liquid admixture of water and orange juice concentrate, the liquid admixture being at a temperature between about 65° and about 130°F., and then adding the imitation orange flavoring. This invention further involves another process of preparing the nutritious orange drink concentrate. The process includes adding whey protein to said water or acidified water, the water being at a temperature between about 65° and about 130°F., and then adding imitation orange flavoring and orange juice concentrate. If acidified water is used, it is preferably acidified with citric acid.

The preferred process of this invention for preparing the nutritious orange drink concentrate includes: (a) adding water to orange juice concentrate; (b) adding an antifoaming agent to admixture (a); (c) heating admixture (b) to 110° to 120°F., and maintaining the temperature in that temperature range; (d) while agitating admixture (b), adding whey protein to admixture (b), the agitation continuing until the whey protein is entirely dissolved in admixture (b); (e) cooling admixture (d) from 65° to 110°F. and maintaining the temperature in that temperature range; (f) adding a portion of the sugar, that will eventually be present in said nutritious orange drink concentrate, to admixture (d); (g) adding citric acid to admixture (f); (h) adding orange pulp base to admixture (g); and (i) adding a mixture or blend of the remaining sugar and an imitation orange flavoring agent (preferably powdered) to admixture (h). Preferably one or two further imitation orange flavoring agents are added to admixture (i), the temperature of admixture (h) being between 40° and 75°F. Preferably heating step (c) is achieved by adding a steam and water mixture to admixture (b), and the orange juice concentrate of step (a) is located (placed) in a jacketed kettle provided with propeller agitation before the water is added. Preferably about one half of the sugar is added in step (f) and the remaining sugar is added in step (i). Preferably from about 19 to about 40 percent of orange juice concentrate, from about 1 to about 27 percent of whey protein concentrate (which reflects from about 0.5 to about 10 percent protein, based on the entire composition), from about 0.1 to about 4 percent of imitation orange flavoring from about 23.5 to about 53 percent of water, from about 0.1 to about 16.1 percent of sugar, from about 0.01 to about 3 percent of citric acid, from about 0.01 to about 0.5 percent of orange pulp base and from about 0.0001 to about 0.1 percent of antifoaming agent are used. The nutritious orange drink concentrate is normally placed in cans, the cans sealed and the sealed cans stored at below 32°F. Preferably the sealed cans are stored at about 0°C.

The nutritious orange juice concentrate can be frozen and stored. After storage, the frozen nutritious orange drink concentrate is thawed by the addition water to frozen concentrate, or is thawed and then water is added to the concentrate. The ratio of the water to the concentrate is usually between about 1:1 and about 2:1. A nutritious orange drink is thereby prepared.

This invention also involves a nutritious orange drink which includes from about 6.33 to about 20 percent of orange juice concentrate, from about 0.35 to about 13.5 percent of whey protein (which reflects from about 0.167 to about 5 percent protein, based on the total composition), from about 0.033 to about 2 percent imitation orange flavoring, and from about 61.8 to about 84.33 percent of water. The drink has a pH between about 3 and about 4.5. The nutritious orange drink may also contain from about 0.033 to about 8 percent of sugar, from about 0.0033 to about 1.5 percent of citric acid and from about 0.0033 to about 0.25 percent of orange pulp base. The nutritious orange drink may contain from about 0.000033 to about 0.05 percent of antifoaming agent. This invention further includes a nutritious orange drink which includes orange juice concentrate, whey protein, imitation orange flavoring, water, sugar, citric acid, orange pulp base and antifoaming agent.

The product of this invention is a high protein orange drink which does not need the inclusion of egg yolk to keep the protein from precipitating, thereby avoiding a gritty taste in the drink. The orange drink of this invention has a pleasant, good platable flavor to taste, has a high energy value, has enough protein to constitute a nutritious food product, and has a pleasant and palatable appearance and aroma. The frozen nutritious orange drink concentrate of this invention remains stable through long storage periods. The concentrate has reconstituted drink of this invention do not have any phase separation problems or coagulation problems.

DETAILED DESCRIPTION OF THIS INVENTION

The FIGURE is a flow diagram illustrating the preferred embodiment (process) of this invention. The preferred process helps impart unique properties to the concentrate and the reconstituted drink.

All of the ingredients used in this invention must be edible.

The orange juice concentrate must be a liquid orange juice concentrate. The orange juice concentrate preferably has a concentration of 45° Brix; concentrations of 58° Brix, and even 65° Brix, are still relatively fluid and pumpable. For example, the orange juice concentrate can have been obtained from Citrus Unshiu orange, Tangerine oranges, Mandarine oranges, Valencia oranges, Navel oranges and Summer oranges.

Whey has been a problem for many years in all the dairy states. Hundreds of millions of gallons must be disposed of every year. Most states have water pollution legislation forbidding the dumping of whey into streams and the cheese factories have encountered increasing difficulties in disposing of this troublesome by-product. This invention helps solve this problem by utilizing some of the whey in the form of a high-protein drink.

Whey is the serum, or watery part, of milk, separated from the more thick or coaguable part (curd) — whey is the thin liquid remaining after the fat and casein have been removed from milk. Whey can also be obtained from skim milk or buttermilk. Whey is a by-product of cheese or casein manufacture. The average composition of whey obtained from ordinary cow's milk (whole milk) is 93.0 percent water, 1.0 percent protein, 0.3 percent fat, 5.0 percent carbohydrates and 0.7 percent ash. Such an average composition has a fuel value of 125 calories per pound. (Curd is much higher in protein content.) Whey often has a pH of about 7.0 to 8.3, but raw whey can be neutral, basic or acidic. Cheese whey from cheddar, Swiss or Italian Cheese has a pH of 5.8 to 6.2 and whey from cottage cheese has a substantially lower pH.

Whey is concentrated in any suitable or conventional process to obtain whey protein concentrate (high protein whey or whey having a high protein content). As used herein, whey protein is processed whey which contains at least 10 percent protein and preferably at least 25 protein. The concentrating process removes the water and may involve removal of some of the carbohydrates, fat and/or ash. The carbohydrate is normally lactose.

Any edible whey protein (concentrate) can be used. A whey protein concentrate normally contains amino acids, such as, lysine, histidine, arginine, aspartic acid, threonine, serine, glutamic acid, proline, glycine, cystine, valine, tryptophan, alanine, isoleucine, leucine, methionine and phenylalanine, and vitamins such as niacin, vitamin B–1 and vitamin B–2. Also as the whey protein is to be used in a food, it should not be contaminated with microorganisms like coliforms, sporeforms, yeasts, molds and salmonella. Whey proteins can usually be stored at normal, dry room temperatures before usage.

The preferred whey protein is ForeTein 35, which is the tradename for a specially processed demineralized high protein edible whey product with 90 percent of the ash removed made by Foremost Foods Company of Foremost McKesson, Inc., of San Francisco, Ca. ForeTein 35 has a guaranteed Analysis of: protein, minimum 35 percent; moisture, maximum 4 percent; fat, range 2.5 to 3.5 percent; lactose, range 50 to 60 percent; and ash, maximum 3.0 percent. ForeTein 35 is soluble in both acid and alkaline solutions, and its solubility properties are not materially affected by various salt levels. ForeTein 35 has a bland flavor (through certain processing, the salts have been reduced to under 3 percent). ForeTein 35 forms a unique gel structure at temperatures of 200°F. at concentration levels of 15 percent. ForeTein 35 contains albumin proteins and provides a stable foam when used with sugars.

Another useful whey protein is Puritein 29, which is the tradename for a modified whey protein made by Purity Products Company, of Mayville, Wis. Puritein 29 contains: 29 percent of protein; 10 percent of ash (Na, 1.3 percent; K, 1.9 percent; Ca, 1.3 percent; P, 1.3 percent; Mg, 0.2 percent); 55 percent of lactose; 2.0 percent of fat; and 4.0 percent moisture.

Enough whey protein (concentrate) is used so that the nutritious orange drink concentrate contains 0.5 to 10 percent protein (based on the entire composition).

Any imitation orange flavoring can be used. The imitation orange enhances the natural orange taste and disguises the whey taste. It is necessary to eliminate or disguise the whey taste so that the resultant drink tastes like orange juice and not like milk, cheese or whey. The preferred orange imitation flavorings and Firmenich orange flavor No. 59.427/AP, and imitation orange flavor Nos. 7629 and 13207 (both made by Food Materials Corp. of Chicago, Ill.).

Preferably the nutritious orange drink concentrate contains citric acid. The citric acid is an acidulant to adjust the pH of the nutritious orange drink concentrate to the desired level. Citric acid has a pleasant acidulous taste. The citric acid restores the taste and acidicity of the juice to approximately its original level. The citric acid can be added as a powder or the like, or in an aqueous solution. Suitable amounts of other edible organic acids can be addded.

Preferably the nutritious orange drink concentrate contains orange pulp base. The orange pulp base is used to make the nutritious orange drink look like natural juice.

Preferably the nutritious orange drink concentrate contains sugar. The sugar level is such as to restore the sweetness of the juice to approximately its original level.

Preferably an antifoaming agent is used. Any antifoaming agent can be used, but preferably the antifoaming agent is Antifoam AF 72 (tradename of General Electric, Silicon Division of Waterford, N.Y.), which is an antifoam emulsion. Any antifoaming agent which is used must be edible, physiologically harmless and useful (soluble) in an aqueous system. The antifoaming or defoaming agent reduces foaming during the preparation of the nutritious orange drink concentrate, such foam potentially interferring with the processing operations.

The nutritious orange drink concentrate can contain L-ascorbic acid (Vitamin C) or any edible salt or ester of L-ascorbic acid, such as ascorbyl palamitate and sodium ascorbate. The L-ascorbic acid or salt or ester thereof can be added as a powder or the like, or an aqueous solution.

The nutritious orange drink concentrate can contain sodium citrate (which with the citric acid forms a buffering system). The sodium citrate can be added as a powder or the like, or as an aqueous solution. In place of sodium citrate, potassium citrate, calcium citrate, lithium citrate or other alkali or alkaline-earth metal salts of citric acid can be used.

An edible buffering agent or buffering agents can be used to control the pH and buffer the flavor of the juice. Examples of such edible buffering agents are sodium citrate (preferred), sodium succinate, sodium phosphate, potassium phosphate and potassium hydrogen phosphate.

The control of the pH is preferably accomplished by the use of relatively small quantities of organic or inorganic buffers. By way of example a relatively very small quantity of sodium citrate, in the presence of citric acid, will serve to raise the pH of a diluted product having a correct sugar-acid ratio, from an unduly low value, say, 2.5, to the entirely acceptable value of 3.5 and to maintain it there throughout the life of the product.

Minor amounts of other vitamins, such as Vitamin A, Vitamin $B_c$ (folic acid), Vitamin $B_6$ (pyroxidine), Vitamin B complex, Vitamin $D_2$, Vitamin $D_3$, Vitamin E, Vitamin H (biotin), Vitamin K, Vitamin G, Vitamin L, Vitamin $L_1$, betaine hydrochloride, carotene, citrus bioflavonids, niacinamide, aluminum nicotinate, calcium and sodium pantothenate, d-pantothenyl alcohol, pyridoxine hydrochloride, thiamine hydrochloride, Vitamin A acetate, Vitamin A palmitate, cyanocobalamin, calciferol, activated 7-dehydrocholesterol, riboflavin-5-phosphate, alpha-tocopherol acetate, Vitamin $K_1$, Vitamin $K_2$, Vitamin $B_1$ and Vitamin $B_2$ (riboflavin), can be added to the nutritious orange drink concentrate.

Minor amounts of other nutrients can be added to the nutritious orange drink concentrate. Examples of such nutrients are iodine compounds, e.g., iodine, cuprous iodide, potassium iodate and potassium iodide and the dietary and mineral nutrients, such as, boric acid, sodium borate, calcium carbonate, calcium glycerophosphate, calcium oxide, calcium phosphate, calcium pyrophosphate, calcium sulfate, cobalt carbonate, cobalt gluconate, cupric chloride, cupric gluconate, cupric sulfate, cupric oxide, sodium fluoride, sodium silicofluoride, calcium fluoride, ferric choline citrate, ferric phosphate, ferric pyrophosphate, ferric sodium pyrophosphate, ferrous lactate, magnesium phosphate, magnesium sulfate, magnesium oxide, manganese citrate, manganese gluconate, manganese glycerophosphate, manganese hypophosphite, ammonium molybdate, molybdenum sesquioxide, molybdenum trioxide, zinc chloride, zinc gluconate, zinc oxide and zinc stearate.

The nutritious orange drink can also contain minor amounts of edible taste intensifiers, edible water wetting agents (emulsifiers or dispersing agent), edible suspending agents and edible preservatives. Examples of edible emulsifiers are: mono-glyceride sodium sulfoacetate, diacetyl tartaric acid ester of a monodiglyceride, polymeric alkylaryl polyether alcohol, polyethylene glycol fatty acid esters, sucrose esters of fatty acids (sucrose dipalmitate), sodium lauryl sulfate, vegetable oils, glyceryl monostearate, acetylated monoglycerides, citrus stearoptene, lecithin, gum arabic, locust bean gum, guar gum, tragacanth gum, pectin, pectin albedo, agar and algin. An example of edible preservatives is benzoate of soda. Examples of edible flavor enhancers of the orange juice are calcium chloride, magnesium chloride, sodium citrate, potassium citrate, and tartaric and maleic acids and their salts. Sodium and potassium citrates not only act in the presence of citric acid as buffering agents, but also act as flavor-enhancing materials.

The nutritious orange drink concentrate has a pH between 3 and 4.5. and the nutritious orange drink has a pH between 3 and 4.5. Protein normally precipitates in this pH level, but this is not so with the nutritious orange drink concentrate or nutritious orange drink of this invention.

The nutritious orange drink concentrate can be packaged in any container which can be used for frozen products. Examples of such containers are frozen juice containers, glass bottles, paper cartons, plastic bags, etc.

The temperatures used in the process of preparing the nutritious orange drink concentrate must not be so high as to destroy the efficacy or decompose the ingredients in the preparation at that point of time in the processing.

The frozen nutritious orange drink concentrate can be reconstituted by water, or the like. For example, the frozen nutritious orange drink concentrate can be thawed by adding water, which reconstitutes the concentrate, or the concentrate is thawed and then water is added to the concentrate. Cold water should be used to reconstitute the frozen nutritious orange drink concentrate so as not to destroy the efficacy of any of the ingredients in the concentrate and because a cool or cold orange drink normally is better tasting. The frozen nutritious orange drink concentrate is usually reconstituted with enough water to have a water to orange juice drink concentrate ratio which is usually between about 1:1 and about 2:1.

The following Table shows the percentage ranges of ingredients in several embodiments of this invention for the nutritious orange drink concentrate and two levels of water reconstitution of the concentrate:

TABLE

|  | drink concentrate % | water 1:1 drink con.,% | water 2:1 drink con.,% |
|---|---|---|---|
| A. a broad embodiment | | | |
| orange juice conc. | 19 –40 | 9.5 –20 | 6.33 –13.33 |
| whey protein (concentrate) | 1 –27 | 0.5 –13.5 | 0.35  41 9 |

TABLE-continued

|  | drink concentrate % | water 1:1 drink con.,% | water 2:1 drink con.,% |
|---|---|---|---|
| imitation flavoring | 0.1 –4 | 0.05 –2 | 0.033 –1.33 |
| water | 23.5 –53 | 61.8 –76.5 | 74.5 –84.33 |
| B. a narrow embodiment | | | |
| A. plus: | | | |
| sugar | 0.1 –16.1 | 0.05 –8.0 | 0.033 –5.37 |
| citric acid | 0.01 –3 | 0.005 –1.5 | 0.0033 –1.00 |
| orange pulp base | 0.01 –0.5 | 0.005 –0.25 | 0.0033 –0.166 |
| C. a narrower embodiment | | | |
| A. and B. plus: | | | |
| antifoaming agent | 0.0001 –0.1 | 0.00005 –0.05 | 0.000033 –0.0 |
| D. | | | |
| percentage of protein (in all of above embodiments, | 0.5 –10 | 0.25 –5 | 0.167 –3.33 |

The following examples are illustrative of this invention. As used in this specification, including the examples, and the claims, all parts ratios and percentages are on a weight basis unless otherwise indicated or obvious to one ordinarily skilled in the art.

EXAMPLE 1

This invention represents the preferred embodiment of this invention.

The nutritious orange drink concentrate prepared in this example had the following composition:

|  | Percent by weight |
|---|---|
| frozen orange juice concentrate (45° Brix) | 37.381 |
| water | 36.482 |
| ForeTein 35 whey protein | 18.045 |
| sugar | 5.952 |
| citric acid | 1.105 |
| orange pulp base | 0.425 |
| imitation flavorings | 0.604 |
| Antifoam AF 72 | 0.006 |
| Total | 100.000 |

(The amounts in this and the other examples have been calculated to percentages of the total composition of the nutritious orange drink concentrate and are used in that manner.)

The process is outlined in the flow diagram of the FIGURE.

37.381 percent of liquid orange juice concentrate was weighed and then placed in a jacketed kettle provided with propeller agitation. 36.482 percent of water was added to the kettle, and then 0.006 percent Antifoam AF 72 was added to the kettle. The admixture was heated with a tempered mixture of steam and water, and stirring in the kettle was started. The temperature of the admixture in the kettle was raised to 115°F. and was maintained between 110° and 120°F. 18.045 percent of ForeTein 35 whey protein were slowly added to the kettle, with care taken to completely disperse the lumps. The stirring continued until the whey protein was completely dissolved. The temperature level was maintained during the time the protein whey was added, and then after addition, the temperature of the admixture was lowered to about 80°F. Care had to be taken through the subsequent addition of sugar-flavor blend that the temperature did not rise above 110°F. 2.976 percent of sugar was added to the admixture. 1.105 percent of citric acid was added to the admixture. Then 0.425 percent of orange pulp base was added to the admixture. 2.976 percent sugar and 0.052 percent of powdered Firmenich orange flavor No. 59.427/AP were blended and then added to the admixture. The temperature was lowered to 65°F. (A temperature of 75°F. is maximum for the following step). 0.276 percent of imitation orange flavor No. 7629 and 0.276 percent of imitation orange flavor No. 13207 (both made by Food Materials Corp.) were added to the admixture, thereby completing the nutritious orange drink concentrate formulation.

The nutritious orange drink concentrate was pumped through a refrigerated votator to a can filler — the concentrate temperature was lowered thereby to a temperature of about 20°F., which produced a sluch consistency in the concentrate. (This slush condition was maintained during the sealing of the cans.) The concentrate was metered and placed in the cans; the lids were placed on the cans and sealed. 12 fluid ounce cans were used and each weighed 410 grams when full. The can filler had a three-way valve that allowed return of any remaining concentrate to the kettle (after the cans were filled) as a storage site until more cans were to be filled. The sealed cans were advanced through a blast freezer, case loaded (cases sealed) and stored at 0°F.

After a period of storage, some of the cans were opened, and reconstituted and thawed with 12 fluid ounces of water, which resulted in a nutritious orange drink.

EXAMPLE 2

Example 1 was repeated except that the ForeTein 35 whey protein was replaced with an equal amount of Puritein 29 whey protein. Canned frozen nutritious orange drink concentrate was obtained, which was stored and then reconstituted with 1.5 parts of cold water to obtain a nutritious orange drink.

EXAMPLE 3

14 percent of whey protein concentrate was added to 45.5 percent of water in a jacketed vessel equipped with a stirrer. The temperature of the material in the vessel was at 95°F. 40 percent of orange juice concentrate was added to the vessel. The temperature of the material in the vessel was lowered to 50°F. 0.5 percent of orange imitation flavor (powdered Firmenich orange flavor No. 59.427/AP) was added. The material was passed through a cooler to lower the temperature to 20°F., canned and frozen at 0°F. After storage the frozen canned nutritious orange drink contrate was reconstituted with 1.3 parts of cold water to obtain a nutritious orange drink.

EXAMPLE 4

14 percent of whey protein was added to a mixture of 44.5 percent of water and 1 percent of citric acid in a jacketed vessel equipped with a stirrer. The temperature of the material in the vessel was at 95°F. 40 percent of orange juice was added to the vessel. The temperature of the material in the vessel was lowered to 50°F. 0.5 percent of orange imitation flavor (powdered Firmenich orange flavor No. 59.427/AP) was added. The material was passed through a cooler to lower the temperature to 20°F., canned and frozen at 0°F. After storage the frozen canned nutritious orange drink concentrate was reconstituted with 1.8 parts of cold water to obtain a nutritious orange drink.

EXAMPLE 5

14 percent of whey protein was added to a mixture of 45.5 percent of water and 40 percent of orange juice in a jacketed vessel equipped with a stirrer. The temperature of the material in the vessel was at 95°F. The temperature of the material in the vessel was lowered to 50°F. 0.5 percent of orange imitation flavor (powdered Firmenich orange flavor No. 59.427/AP) was added. The material was passed through a cooler to lower the temperature to 20°F., canned and frozen at 0°F. After storage the frozen, canned nutritious orange drink concentrate was reconstituted with 1.3 parts of cold water to obtain a nutritious orange drink.

What I claim is:

1. A process of preparing a nutritious orange drink concentrate having a pH between 3 and 4.5 which comprises (a) admixing from about 23.5 to about 53 percent of water with about 19 to about 40 percent of orange juice concentrate; (b) adding from about 0.0001 to about 0.1 percent of an antifoaming agent to admixture (a); (c) heating admixture (b) to 110° to 120°F., and maintaining the temperature in that temperature range in the following step (d); (d), while agitating admixture (b), adding from about 1 to about 27 percent of a whey protein concentrate to admixture (b), the agitation continuing until the whey protein concentrate is entirely dissolved in admixture (b); (e) cooling admixture (d) to 65° to 110°F., and maintaining the temperature in that range in the following steps (f) to (h); (f) adding a portion of the sugar that will eventually be present in the nutritious orange drink concentrate to admixture (d); (g) adding from about 0.01 to about 3 percent of citric acid to admixture (f); (h) adding from about 0.01 to about 0.5 percent of orange pulp base to admixture (g); and (i) adding a mixture or blend of the remaining sugar and from about 0.1 to about 4 percent of an imitation orange flavoring agent to admixture (h), admixture (h) having a maximum temperature of 75°F. at the start of step (i); from about 0.1 to about 16.1 percent of sugar being used in the nutritious orange drink concentrate, and the whey protein concentrate providing a protein content of about 0.5 to about 10 percent based on the total composition of the nutritious orange drink concentrate.

2. A process as claimed in claim 1 wherein one or two further imitation orange flavoring ingredients are added to admixture (i), the temperature of admixture (i) being between 40° and 75°F.

3. A process as claimed in claim 1 wherein about one half of the sugar is added in step (f) and the remaining sugar is added in step (i).

4. A process wherein the nutritious orange drink concentrate prepared by claim 1 is placed in cans, the cans are sealed and the sealed cans are stored at below 32°F.

5. A process as described in claim 4 wherein the sealed cans are stored at about 0°F.

6. A nutritious orange drink concentrate prepared by the process of claim 1.

* * * * *